(12) United States Patent
Tang

(10) Patent No.: US 11,153,856 B2
(45) Date of Patent: Oct. 19, 2021

(54) METHOD AND APPARATUS FOR TRANSMITTING UPLINK SIGNAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/400,613

(22) Filed: May 1, 2019

(65) Prior Publication Data
US 2019/0261358 A1 Aug. 22, 2019

Related U.S. Application Data

(63) Continuation of application No. PCT/CN2016/104447, filed on Nov. 3, 2016.

(51) Int. Cl.
*H04W 72/04* (2009.01)
*H04L 5/00* (2006.01)

(52) U.S. Cl.
CPC ....... *H04W 72/0413* (2013.01); *H04L 5/0044* (2013.01); *H04W 72/044* (2013.01)

(58) Field of Classification Search
CPC ..... H04L 5/044; H04L 1/0007; H04L 1/0014; H04L 1/1861; H04L 5/0001; H04L 5/0005; H04L 5/0007; H04L 5/0008–0012; H04L 5/0042; H04L 5/0044; H04L 5/0046; H04L 5/0048; H04L 5/0051; H04L 5/0053; H04L 5/0055–0057; H04L 5/0091;
(Continued)

(56) References Cited

U.S. PATENT DOCUMENTS 7,952,991 B2 * 5/2011 Kim .................. H04L 27/2602
370/210
8,830,927 B2 * 9/2014 Lunttila ............... H04B 7/0413
370/329
(Continued)

FOREIGN PATENT DOCUMENTS

CN 101606338 A 12/2009
CN 102119552 A 7/2011
(Continued)

OTHER PUBLICATIONS

The First Office Action and search report of corresponding Chinese application No. 201680090245.5, dated Mar. 9, 2020.
(Continued)

*Primary Examiner* — Thomas R Cairns
(74) *Attorney, Agent, or Firm* — Ladas & Parry, LLP

(57) ABSTRACT

Embodiments of the present disclosure disclose a method and an apparatus for transmitting an uplink signal, which can efficiently utilize uplink frequency-selectiveness, thereby improving uplink spectral efficiency. The method includes: determining, by a first terminal device, an uplink multiple access scheme for an uplink control signal according to whether a time domain resource unit used for transmitting the uplink control signal is also used for transmitting uplink data; and transmitting, by the first terminal device, the uplink control signal by using the determined uplink multiple access scheme.

16 Claims, 2 Drawing Sheets

```
A first terminal device determines an uplink multiple access
scheme for an uplink control signal according to whether a       ~S110
time domain resource unit used for transmitting the uplink
   control signal is also used for transmitting uplink data

│
           │

The first terminal device transmits the uplink control signal   ~S120
    by using the determined uplink multiple access scheme
```

(58) Field of Classification Search
CPC ..... H04L 5/0092–0098; H04L 25/0212; H04L 25/0226; H04L 25/03006; H04L 25/03834; H04L 27/0004; H04L 27/02; H04L 27/10; H04L 27/18; H04L 27/183; H04L 27/2602; H04L 27/26025–26136; H04L 25/2626; H04L 25/26265–2646; H04L 25/2634; H04L 25/264; H04L 25/2665; H04L 25/32; H04L 25/3488; H04L 47/365; H04L 49/9057; H04L 69/04; H04L 69/32; H04W 72/0413; H04W 72/044; H04W 4/18; H04W 16/28; H04W 28/06; H04W 28/065; H04W 56/0005; H04W 56/0045; H04W 72/02; H04W 72/0446–0473; G06F 17/141; G06F 17/147

See application file for complete search history.

(56) References Cited

U.S. PATENT DOCUMENTS

| | | | |
|---|---|---|---|
| 9,184,825 B2* | 11/2015 | Kimura | H04W 16/26 |
| 2008/0212464 A1 | 9/2008 | Kim et al. | |
| 2010/0034152 A1 | 2/2010 | Imamura | |
| 2015/0181589 A1* | 6/2015 | Luo | H04L 5/0048 370/329 |
| 2015/0304092 A1 | 10/2015 | Hwang et al. | |

FOREIGN PATENT DOCUMENTS

| | | |
|---|---|---|
| CN | 102301792 A | 12/2011 |
| CN | 105025574 A | 11/2015 |
| CN | 105307259 A | 2/2016 |
| EP | 3340718 A1 | 6/2018 |
| EP | 3531755 A1 | 8/2019 |
| EP | 3537796 A1 | 9/2019 |
| JP | 2010518776 A | 5/2010 |
| JP | 2011530837 A | 12/2011 |
| JP | 2016214704 A | 12/2016 |
| WO | 2018064306 A1 | 4/2018 |
| WO | 2018081975 A1 | 5/2018 |
| WO | 2018084137 A1 | 5/2018 |

OTHER PUBLICATIONS

International Search Report from PCT/CN2015/104447, dated Apr. 11, 2017, with English translation from WIPO.
Written Opinion of the International Searching Authority, dated Apr. 11, 2017, with English translation from Google Translate.
Extended European Search Report dated Oct. 28, 2019; Appln No. 16920703.2.
Qualcomm Incorporated : "User Multiplexing of DFTs-OFDM and OFDM in uplink", 3GPP Draft; R1-1610114; Mobile Competence Centre; 650, Route Des Lucioles; F-06921 Sophia-Antipolis Cedex, vol. RAN WG1, No. Lisbon, Portugal; Oct. 10 2016-Oct. 14, 2016, Oct. 9, 2016 (2016-20-09), XP051150138.
The third Office Action of corresponding Chinese application No. 201680090245.5, dated Sep. 16, 2020.
The first Office Action of corresponding Japanese application No. 2019-522549, dated Dec. 4, 2020.
Qualcomm et al, R1-1610485; WF on Waveform for NR Uplink, published on Oct. 11, 2016.
The second Office Action of corresponding Chinese application No. 201680090245.5, dated Jun. 9, 2020.
The First Office Action of corresponding European application No. 16920703.2, dated Aug. 7, 2020.
The Notice of Allowance of corresponding Chinese application No. 201680090245.5, dated Jan. 12, 2021.
The first Office Action of corresponding Taiwan application No. 106137571, dated Jan. 29, 2021.
The first Office Action of corresponding Indian application No. 201917021497, dated Feb. 18, 2021.

* cited by examiner

METHOD AND APPARATUS FOR TRANSMITTING UPLINK SIGNAL

CROSS-REFERENCE TO RELATED APPLICATION

This application is a continuation of International Application No. PCT/CN2016/104447, filed on Nov. 3, 2016, the disclosure of which is hereby incorporated by reference in its entirety.

TECHNICAL FIELD

Embodiments of the present disclosure relate to the field of communications and, more particularly, to a method and an apparatus for transmitting an uplink signal.

BACKGROUND

In mobile communication, a technical scheme for preventing mutual interference between different signals are referred to as a multiple access scheme, where a multiple access scheme for uplink signal transmission is referred to as a uplink multiple access scheme. The uplink signal transmission corresponds to several uplink multiple access schemes, such as discrete Fourier transform-spread-orthogonal frequency division multiplexing (Discrete Fourier Transform-Spread-Orthogonal Frequency Division Multiplexing, DFT-S-OFDM), cyclic prefix-orthogonal frequency division multiplexing (Cyclic Prefix-Orthogonal Frequency Division Multiplexing, CP-OFDM), or the like. In the prior art, for transmission of uplink data, a corresponding uplink multiple access scheme is configured by a network device for uplink data from a terminal device according to an uplink channel quality of the terminal device, and the terminal device performs the uplink data transmission by using the configured uplink multiple access scheme. However, for transmission of an uplink control signal, only DFT-S-OFDM is used by the terminal device for the uplink control signal transmission, which cannot fully utilize uplink frequency-selectiveness, thereby affecting uplink spectral efficiency. The method for transmitting the uplink control signal in the prior art has low flexibility and low efficiency, which is disadvantageous for the terminal device to perform uplink transmission efficiently.

SUMMARY

Embodiments of the present disclosure provide a method and an apparatus for transmitting an uplink signal, which can improve flexibility of a terminal device in uplink control signal transmission.

In a first aspect, a method for transmitting an uplink signal is provided, including: determining, by a first terminal device, an uplink multiple access scheme for an uplink control signal according to whether a time domain resource unit used for transmitting the uplink control signal is also used for transmitting uplink data; and transmitting, by the first terminal device, the uplink control signal by using the determined uplink multiple access scheme.

In this solution, the first terminal device may determine the uplink multiple access scheme for the uplink control signal according to a condition of the time domain resource unit, which can efficiently utilize the uplink frequency-selectiveness, thereby improving the uplink spectral efficiency and facilitating an efficient uplink transmission of the first terminal device.

In a possible implementation manner of the first aspect, the determining, by the first terminal device, the uplink multiple access scheme for the uplink control signal according to whether the time domain resource unit used for transmitting the uplink control signal is also used for transmitting the uplink data, includes: if the time domain resource unit is also used for transmitting the uplink data, determining, by the first terminal device, that the uplink multiple access scheme for the uplink control signal is the same as an uplink multiple access scheme for the uplink data.

In this solution, the uplink data and the uplink control signal within the same time domain resource unit are transmitted using the same uplink multiple access scheme, which can reduce a radio frequency implementation complexity of the terminal device.

In a possible implementation manner of the first aspect, the determining, by the first terminal device, the uplink multiple access scheme for the uplink control signal according to whether the time domain resource unit used for transmitting the uplink control signal is also used for transmitting the uplink data, includes: if the time domain resource unit is not used for transmitting the uplink data, determining, by the first terminal device, that the uplink multiple access scheme for the uplink control signal is an uplink multiple access scheme pre-configured by a network device for transmitting the uplink control signal.

In a possible implementation manner of the first aspect, the determining, by the first terminal device, the uplink multiple access scheme for the uplink control signal according to whether the time domain resource unit used for transmitting the uplink control signal is also used for transmitting the uplink data, includes: if the time domain resource unit is also used for transmitting the uplink data, determining, by the first terminal device, the uplink multiple access scheme for the uplink control signal according to whether a time domain resource occupied by the uplink control signal overlaps with a time domain resource occupied by the uplink data.

In this solution, the first terminal device may further determine the uplink multiple access scheme for the uplink control signal according to a location relationship between the time domain resource for the uplink data and the time domain resource for the uplink control signal, so that the first terminal device determine an appropriate uplink multiple access scheme for the uplink control signal.

In a possible implementation manner of the first aspect, the determining, by the first terminal device, the uplink multiple access scheme for the uplink control signal according to whether the time domain resource unit used for transmitting the uplink control signal is also used for transmitting the uplink data, includes: if the time domain resource unit is also used for transmitting the uplink data, and a time domain resource occupied by the uplink control signal at least partially overlaps with a time domain resource occupied by the uplink data, determining, by the first terminal device, that the uplink multiple access scheme for the uplink control signal is the same as an uplink multiple access scheme for the uplink data.

In this solution, using one uplink multiple access scheme on the overlapping time domain resource enables transmission of both uplink data and an uplink control signal via the same carrier.

In a possible implementation manner of the first aspect, the determining, by the first terminal device, the uplink multiple access scheme for the uplink control signal according to whether the time domain resource unit used for transmitting the uplink control signal is also used for transmitting the uplink data, includes: if the time domain resource unit is also used for transmitting the uplink data, and a time domain resource occupied by the uplink control signal does not overlap with a time domain resource occupied by the uplink data, determining, by the first terminal device, that the uplink multiple access scheme for the uplink control signal is an uplink multiple access scheme pre-configured by a network device for transmitting the uplink control signal.

In a possible implementation manner of the first aspect, the determining, by the first terminal device, the uplink multiple access scheme for the uplink control signal according to whether the time domain resource unit used for transmitting the uplink control signal is also used for transmitting the uplink data, includes: determining, by the first terminal device, the uplink multiple access scheme for the uplink control signal according to whether the first terminal device transmits the uplink data over the time domain resource unit; or determining, by the first terminal device, the uplink multiple access scheme for the uplink control signal according to whether there is a terminal device that transmits the uplink data over the time domain resource unit.

This solution has high flexibility, good compatibility and scalability.

In a possible implementation manner of the first aspect, the uplink multiple access scheme includes discrete Fourier transform-spread-orthogonal frequency division multiplexing DFT-S-OFDM, cyclic prefix-orthogonal frequency division multiplexing CP-OFDM, single carrier-frequency division multiple access SC-FDMA or orthogonal frequency division multiple access OFDMA.

In this solution, the uplink multiple access scheme for the uplink control signal can correspond to multiple types, which can improve the flexibility of the uplink control signal transmission.

In a possible implementation manner of the first aspect, if the determined uplink multiple access scheme is DFT-S-OFDM or SC-FDMA, the transmitting, by the first terminal device, the uplink control signal by using the determined uplink multiple access scheme, includes: transmitting, by the first terminal device, the uplink control signal after performing a discrete Fourier transform DFT on the uplink control signal.

In a possible implementation manner of the first aspect, if the determined uplink multiple access scheme is CP-OFDM or OFDMA, the transmitting, by the first terminal device, the uplink control signal by using the determined uplink multiple access scheme, includes: transmitting, by the first terminal device, the uplink control signal after adding a cyclic prefix CP into the uplink control signal.

In a possible implementation manner of the first aspect, the method further includes: determining, by the first terminal device, an uplink control channel structure corresponding to the determined uplink multiple access scheme; and the transmitting, by the first terminal device, the uplink control signal by using the determined uplink multiple access scheme includes: transmitting, by the first terminal device, the uplink control signal by using the determined uplink multiple access scheme and the determined uplink control channel structure.

In this solution, the first terminal device determines the uplink control channel structure according to the determined uplink multiple access scheme without additional signaling indications, which can save signaling overhead.

In a possible implementation manner of the first aspect, the control channel structure includes at least one of the following: a resource location of a demodulation reference signal DMRS of an uplink control channel; a transmission mode for the uplink control signal carried by the uplink control channel; a time domain resource occupied by the uplink control channel; and a frequency domain resource occupied by the uplink control channel.

In a possible implementation manner of the first aspect, the time domain resource unit includes a subframe, a slot, a mini-slot, or an orthogonal frequency division multiplexing OFDM symbol.

In a second aspect, an apparatus for transmitting an uplink signal is provided for performing the method according to the first aspect or any possible implementation manner of the first aspect. In particular, the apparatus may include modules and/or units for performing the method according to the first aspect or any possible implementation manner of the first aspect described above.

In a third aspect, a device for transmitting an uplink signal is provided, where the device includes a transceiver, a memory, and a processor. The transceiver is configured to transmit and receive a signal, the memory is configured to store instructions, and the processor is configured to execute instructions stored in the memory, where the execution of the instructions stored in the memory enables the processor to perform the method according to the first aspect or any possible implementation manner of the first aspect.

In a fourth aspect, a computer readable storage medium for storing a computer program is provided, where the computer program includes instructions for executing any method according to the first aspect or any possible implementation manner of the first aspect.

DESCRIPTION OF EMBODIMENTS

Figure 1:
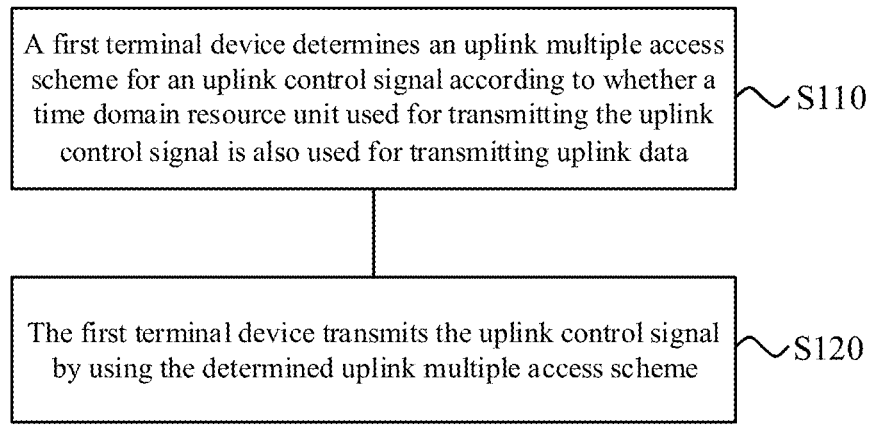
FIG. 1 is a schematic flowchart of an example of a method for transmitting an uplink signal according to an embodiment of the present disclosure.

Technical solutions in embodiments of the present disclosure will be clearly and completely described in the following with reference to the accompanying drawings.

Various embodiments are described in embodiments of the present disclosure in connection with a terminal device. The terminal device may also be called an user equipment (User Equipment, UE), an access terminal, a subscriber unit, a subscriber station, a mobile station, a mobile terminal, a remote station, a remote terminal, a mobile device, a user terminal, a terminal, a wireless communication device, and a subscriber agent or a subscriber device. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device or computing device with functions of wireless communication, or another processing device connected to a wireless modem, an in-vehicle device, a wearable device, and a terminal device in a future 5G network.

Additionally, various embodiments of the present disclosure are described in connection with the network device. The network device may be a device for communicating with a mobile device, such as a network side device. The network side device may be a base transceiver station (Base Transceiver Station, BTS) in GSM or CDMA, or may be a base station (NodeB, NB) in wideband code division multiple access WCDMA, or may also be an evolutional node B (Evolutional NodeB, eNB or eNodeB) in LTE, or a relay station, an access point or a remote radio unit (Remote Radio Unit, RRU), or an in-vehicle device, a wearable device, and a network side device in the future 5G network. In an embodiment, the network device is a base station.

It should be understood that an orthogonal frequency division multiplex (Orthogonal Frequency Division Multiplex, OFDM) symbol may be referred to as a symbol for short.

It should also be understood that in 5G technology or other future communication systems, a multiple access scheme may also be referred to as a waveform.

It should be noted that, in the embodiments of the present disclosure, a serial number such as "first" and "second" are only used to distinguish different objects, for example, to distinguish different uplink control channels, different terminal devices, and should not be construed as limiting embodiments of the present disclosure.

When the terminal device transmits uplink data, the network device may configure an uplink multiple access scheme for the terminal device, such that the uplink data transmitted by the terminal device using the configured uplink multiple access scheme can be received normally by the network device. The uplink multiple access scheme configured by the network device for each terminal device is depending on capabilities of the terminal device, capabilities of the network device, and/or the current uplink channel state (eg, uplink channel quality), or the like. The uplink multiple access scheme for the uplink data may include multiple types, such as DFT-S-OFDM, CP-OFDM, single carrier-frequency division multiple access (Single Carrier-Frequency Division Multiple Access, SC-FDMA) or orthogonal frequency division multiple access (Orthogonal Frequency Division Multiple Access, OFDMA), or the like.

However, for transmission of an uplink control signal, only the transmission scheme of DFT-S-OFDM is currently used for uplink control signal transmission. Methods for transmitting an uplink control signal in the prior art has low flexibility which is disadvantageous for an efficient uplink transmission.

In view of foregoing, embodiments of the present disclosure provide a method for transmitting the uplink signal, which can flexibly determine the uplink multiple access scheme for the uplink control signal to be transmitted by the terminal device, and improve transmission performance of the uplink control signal. The method for transmitting the uplink signal implemented by the embodiment of the present disclosure is described in detail below.

FIG. 1 is a schematic flowchart of an example of a method for transmitting an uplink signal according to an embodiment of the present disclosure. Taking an uplink control signal being transmitted by a first terminal device as an example, the method for transmitting the uplink signal according to the embodiment of the present disclosure is described in detail. It should be understood that the first terminal device may be any one of terminal devices. The term "first" is only used for distinction and description, and should not be construed as limiting embodiments of the present disclosure.

It should be understood that FIG. 1 is a schematic flowchart of a method for transmitting an uplink signal according to an embodiment of the present disclosure, showing detailed communication steps or operations of the method, but the steps or operations are merely examples, other operations or variations of the various operations in FIG. 1 may also be performed by the embodiment of the present disclosure. Moreover, the various steps in FIG. 1 may be performed in a different order than that presented in FIG. 1, and it is possible that not all operations in FIG. 1 are to be performed.

As shown in FIG. 1, the method 100 for transmitting an uplink signal includes:

S110: a first terminal device determines an uplink multiple access scheme for an uplink control signal according to whether a time domain resource unit used for transmitting the uplink control signal is also used for transmitting uplink data.

Specifically, the first terminal device may determine whether the time domain resource used for transmitting the uplink control signal is used for transmitting the uplink data (and obtain a result of the determination); and the first terminal device may determine, according to the result of the determination, the uplink multiple access scheme for the uplink control signal.

The uplink control signal may be uplink control information. The uplink control signal may also be an uplink control channel, where the uplink control channel is a physical channel used to carry the uplink control information. For example, the uplink control channel may be a physical uplink control channel (Physical Uplink Control Channel, PUCCH), and the uplink data may be carried in a physical uplink shared channel (Physical Uplink Shared Channel, PUSCH).

The time domain resource unit refers to a time domain resource unit for transmitting a signal. For example, the time domain resource unit may be a subframe, a transmission time interval (Transmission Time Interval, TTI), a slot, a mini-slot, or an OFDM symbol, or the like. For the sake of brevity, the "time domain resource unit used for transmitting an uplink control signal" may be referred to as "a first time domain resource unit" for short.

In an embodiment of the present disclosure, the S110 may include:

the first terminal device determines whether the time domain resource unit corresponding to a first index is also used for transmitting the uplink data, and determines the uplink multiple access scheme for the uplink control signal.

Specifically, the first index refers to an index corresponding to the time domain resource unit used for transmitting the uplink control signal. The first terminal device may acquire the first index, and determine whether the time domain resource unit corresponding to the first index is also used for transmitting the uplink data. For example, an index number of a time domain resource unit allocated by a network device to an uplink control signal of the first terminal device is N (≥0), and after acquiring the index number, the first terminal device may determine whether the time domain resource unit corresponding to the index number is also used for transmitting the uplink data to determine the uplink multiple access scheme of the uplink control signal.

It should be understood that in the embodiment of the present disclosure, whether the first time domain resource unit is also used for transmitting the uplink data may include at least one of the following two situations:

(1) whether the first time domain resource unit includes (or has) a time domain resource used for transmitting the uplink data. If the first time domain resource unit includes the time domain resource for transmitting the uplink data, the first time domain resource unit is also used for transmitting the uplink data. Otherwise, the first time domain resource unit is not used for transmitting uplink data.

By way of example, it is assumed that the first time domain resource unit is a slot including 7 symbols, where the slot includes a first resource region for transmitting the uplink control signal (for example, symbols numbered 0-2) and a second resource region for transmitting the uplink data (for example, symbols numbered 3-6). Regardless of whether the second resource region actually transmits the uplink data, the slot is considered to be also used for transmitting the uplink data, since the slot includes the second resource region for transmitting the uplink data.

(2) whether the first time domain unit transmits the uplink data.

By way of example, it is assumed that the first time domain resource unit is a slot including 7 symbols, where the preceding 3 symbols of the slot are occupied by the uplink control signal, and the posterior 4 symbols of the slot are occupied by the uplink data. This slot is also used for transmitting the uplink data. Otherwise, if no symbol in the slot is occupied by the uplink data, the slot is not used for transmitting the uplink data.

In an embodiment of the present disclosure, the first terminal device may determine, according to a structure of the first time domain resource unit, whether the first time domain resource unit is also used for transmitting the uplink data (or whether the first time domain resource unit includes a time domain resource for transmitting the uplink data). Specifically, the structure of the first time domain resource unit may be the number of OFDM symbols in the time domain resource unit used to transmit a downlink control signal, downlink data, uplink data, and an uplink control signal, respectively. For example, if the number of OFDM symbols in the first time domain resource unit used for transmitting the uplink data is greater than 1, the first time domain resource unit is considered to be also used for transmitting the uplink data. Otherwise, it is considered to be not used for transmitting the uplink data. For another example, if the first time domain resource unit is an uplink transmission resource unit, the first time domain resource unit is considered to be also used for transmitting the uplink data. If the first time domain resource unit is a downlink transmission resource unit, it is considered to be not used for transmitting uplink data.

It should be noted that, which specific situation may be included in whether the first time domain resource unit is also used for transmitting the uplink data may be configured or appointed according to actual needs, which is not limited in the embodiment of the present disclosure.

It should also be understood that the uplink data in the embodiment of the present disclosure may also include at least one of the following two situations:

(1) the uplink data is uplink data from the first terminal device. In other words, the S110 may include:

the first terminal device determines the uplink multiple access scheme for the uplink control signal according to whether the first time domain resource unit is also used for transmitting the uplink data from the first terminal device.

(2) the uplink data is uplink data from a terminal device. In other words, the S110 may include:

the first terminal device determines the uplink multiple access scheme for the uplink control signal according to whether the time domain resource unit for transmitting the uplink control signal is also used for transmitting the uplink data from the terminal device.

It should be understood that the difference between the two situations of the uplink data is that, for (2), the uplink data may be not only the uplink data from the first terminal device, but also uplink data from another terminal device, such as uplink data from a second terminal device.

It should be noted that which specific situation may be included in the uplink data may be configured or appointed according to actual needs, which is not limited in the embodiment of the present disclosure.

With reference to the following specific implementation manners, how the first terminal device determines the uplink multiple access scheme for the uplink control signal is described in detail below.

Situation 1: The time domain resource unit is also used for transmitting the uplink data.

Specifically, when the first time domain resource unit is also used for transmitting the uplink data, there may be two manners for the first terminal device to determine the uplink multiple access scheme for the uplink control signal:

Manner 1:

The first terminal device determines that the uplink multiple access scheme for the uplink control signal is the same as an uplink multiple access scheme for the uplink data. In other words, if the first time domain resource unit is used for transmitting both the uplink control signal and the uplink data, the uplink multiple access scheme for the uplink control signal is the same as of the uplink multiple access scheme for the uplink data.

Multiple manners may be used by the first terminal device to acquire the uplink multiple access scheme for the uplink data.

For example, it is assumed that the uplink data is the uplink data from the first terminal device. The network device may configure the uplink multiple access scheme for the uplink data to the first terminal device via a high layer signaling (for example, RRC signaling) or a physical layer signaling, so that the first terminal device acquires the uplink multiple access scheme for the uplink data. The uplink multiple access scheme for the uplink data may also be pre-appointed by the network device and the first terminal device.

For another example, it is assumed that the uplink data is the uplink data from the second terminal device. The network device may send indication information to the first terminal device, indicating an uplink multiple access scheme for the uplink data from the second terminal device, so that the first terminal device receives the indication information and acquires the uplink multiple access scheme for the uplink data from the second terminal device. The network device may also broadcast the uplink multiple access scheme for the uplink data, and all terminal devices within a cell covered by the network device may use the uplink multiple access scheme when transmitting the uplink data. Therefore, the first terminal device may acquire the uplink multiple access scheme for the uplink data from the second terminal device.

When the first time domain resource unit is also used for transmitting the uplink data, the first terminal device determines that the uplink multiple access scheme for the uplink control channel is the uplink multiple access scheme for the uplink data. The uplink data and the uplink control signal within the same time domain resource unit are transmitted using the same uplink multiple access scheme, which can reduce a radio frequency implementation complexity of the terminal device.

It should be understood that, in the Manner 1, resources occupied by the uplink data and the uplink control signal may be time division multiplexing (Time Division Multiplexing, TDM). That is, the uplink data and the uplink control signal may occupy different time domain resources in the first time domain resource unit. For example, different OFDM symbols in a slot is occupied or different slots in a subframe may be occupied. For example, the first time domain resource unit is a slot with a length of 7 symbols, where symbols numbered 0-2 in the first time domain resource unit are used for the uplink control signal transmission, and symbols numbered 3-6 are used for the uplink data transmission. Resources occupied by the uplink data and the uplink control signal may also at least partially overlap. For example, the first time domain resource unit is a slot with a length of 7 symbols, where symbols numbered 0-2 in the first time domain resource unit are used for the uplink control signal transmission, and symbols numbered 2-6 are used for the uplink data transmission. In the Manner 1, the first terminal device may determine that the uplink multiple access scheme for the uplink control signal is the same as the uplink multiple access scheme for the uplink data, as long as the first time domain resource unit is also used for transmitting the uplink data.

Manner 2:

The first terminal device further determines the uplink multiple access scheme for the uplink control signal according to whether a time domain resource occupied by the uplink control signal overlaps with a time domain resource occupied by the uplink data.

Specifically, if the first time domain resource unit is also used for transmitting the uplink data, the first terminal device needs to further determine whether the time domain resource occupied by the uplink control signal overlaps with the time domain resource occupied by the uplink data, and then determines then uplink multiple access scheme for the uplink control signal.

In a possible design, if the time domain resource occupied by the uplink control signal at least partially overlaps with the time domain resource occupied by the uplink data, the first terminal device determines that the uplink multiple access scheme for the uplink control signal is the same as the uplink multiple access scheme for the uplink data.

For example, it is assumed that the first time domain resource unit is 1 symbol, the 1 symbol is used for transmitting both the uplink control signal and the uplink data, that is, the uplink control signal and the uplink data are transmitted at the same time, the first terminal device may determine that the uplink multiple access scheme for the uplink control signal is the same as the uplink multiple access scheme for the uplink data.

For another example, it is assumed that the first time domain resource unit is a mini-slot with a length of 3 symbols, where symbols numbered 0-1 in the first time domain resource unit are used for transmitting the uplink control signal, and symbols numbered 1-2 in the first time domain resource unit are used for transmitting the uplink data. The time domain resources used for transmitting the uplink control signal overlap with the time domain resources used for the uplink data (the symbol numbered 1), and the first terminal device may determine that the uplink multiple access scheme for the uplink control signal is the same as the uplink multiple access scheme for the uplink data.

A device among existing terminal devices cannot support usage of two different multiple access schemes at the same time on the same carrier. In the embodiment of the present disclosure, the same uplink multiple access scheme is used on the overlapping time domain resource, which can support transmission of the uplink control signal and the uplink data on the same carrier, thereby being beneficial to improving utilization of spectrum resources.

In another possible design, if the time domain resource unit is also used for transmitting the uplink data, and the time domain resource occupied by the uplink control signal does not overlap with the time domain resource occupied by the uplink data, the first terminal device determines that the uplink multiple access scheme for the uplink control signal is a preset uplink multiple access scheme (or that pre-configured by the network device) for transmitting the uplink control signal.

For example, the first time domain resource unit is a slot with a length of 7 symbols, where symbols numbered 0-2 in the first time domain resource unit are used for transmitting the uplink control signal, and symbols numbered 3-6 are used for transmitting the uplink data. Although the first time domain resource unit is used for transmitting both the uplink control signal and the uplink data, the first terminal device may determine that the uplink multiple access scheme for the uplink control signal is the preset uplink multiple access scheme for transmitting the uplink control signal, since the time domain resources occupied by the uplink control signal do not overlap with the time domain resources occupied by the uplink data.

The preset uplink multiple access scheme for transmitting the uplink control signal may include at least the following:

1) An uplink multiple access scheme configured by the network device for the uplink control signal. For example, the network device configures the uplink multiple access scheme for the uplink control signal via a RRC signaling or a downlink control information (Downlink Control Information, DCI) signaling.

2) An uplink multiple access scheme configured by the network device for an uplink control signal from a terminal device. For example, the uplink multiple access scheme configured by the network device for the uplink control signal from the first terminal device (or a terminal device within the cell covered by the network device) is a first uplink multiple access scheme. The preset uplink multiple access scheme for transmitting the uplink control signal is the first uplink multiple access scheme, regardless of whether the first terminal device transmits a first uplink control signal or a second uplink control signal.

3) An uplink multiple access scheme pre-appointed by the network device and the first terminal device. For example, a fixed uplink multiple access scheme may be pre-appointed by the network side and the first terminal device.

The uplink multiple access scheme for the uplink control signal may be flexibly configured or appointed as needed, so that in some cases, the first terminal device may use the pre-configured or pre-appointed uplink multiple access scheme as the uplink multiple access scheme for the uplink control signal.

Situation 2: The first time domain resource unit is not used for transmitting the uplink data.

If the time domain resource unit is not used for transmitting the uplink data, the first terminal device determines that the uplink multiple access scheme for the uplink control signal is a preset uplink multiple access scheme for transmitting the uplink control signal. For details of the preset uplink multiple access scheme for transmitting the uplink control signal, reference may be made to the above description, which is not repeated herein for the sake of brevity.

Figure 2:
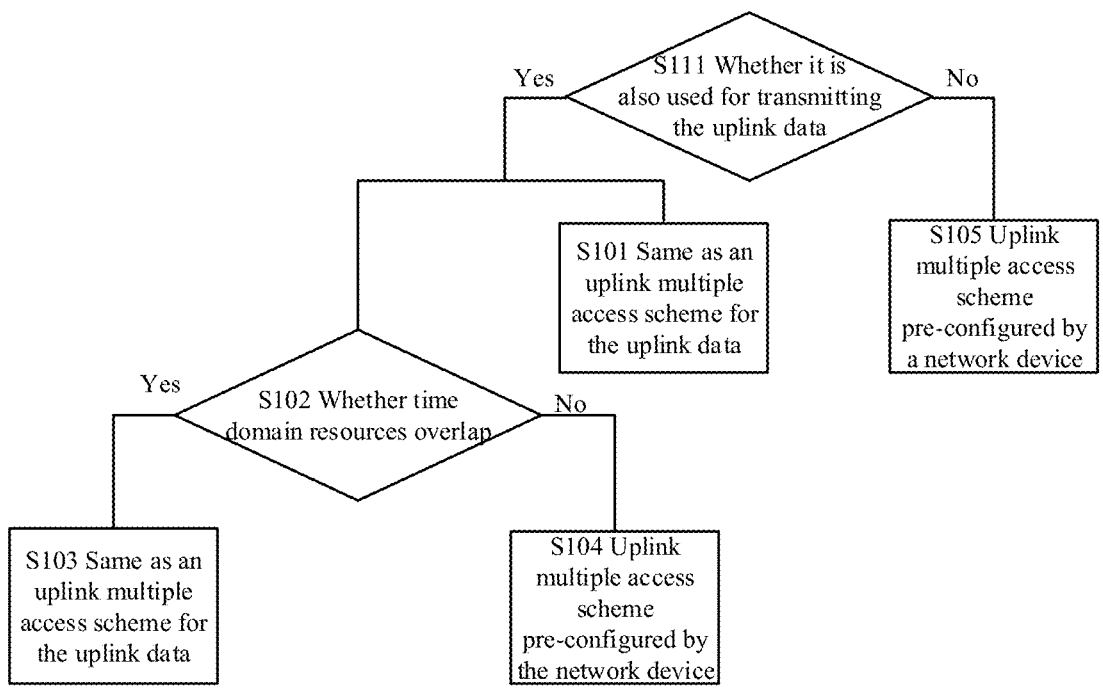
FIG. 2 is a schematic flowchart of another example of a method for transmitting an uplink signal according to an embodiment of the present disclosure.

FIG. 2 is a schematic flowchart of another example of a method for transmitting an uplink signal according to an embodiment of the present disclosure. It should be understood that FIG. 2 is a schematic flowchart of various possible situations and possible manners for S110, the steps or operations are merely examples, and other operations or variations of the various operations shown in FIG. 2 may also be performed by the embodiment of the present disclosure. Moreover, the various steps in FIG. 2 may be performed in a different order than that presented in FIG. 2, and it is possible that not all operations in FIG. 2 are to be performed.

In the embodiment of the present disclosure, the network device may configure an uplink multiple access scheme for the uplink data and that for the uplink control signal, respectively. For example, it is assumed that the network device configures a first uplink multiple access scheme for the uplink data from the first terminal device, and configures a second uplink multiple access scheme for the uplink control signal from the first terminal device. The first terminal device may perform the following method to determine the uplink multiple access scheme for the uplink control signal.

As shown in FIG. 2, the S110 includes:

S111: the first terminal device determines whether the time domain resource unit (referred to as the first time domain resource unit for short) used for transmitting the uplink control signal is also used for transmitting the uplink data.

In the situation where the first time domain resource unit is further used for transmitting the uplink data from the first terminal device:

For the Manner 1, the S110 further includes:

S101: the first terminal device may determine, that the uplink multiple access scheme for the uplink control signal is the same as the uplink multiple access scheme for the uplink data, that is, the first uplink multiple access scheme.

For Manner 2, the S110 further includes:

S102: the first terminal device needs to further determine whether a time domain resource used for transmitting the uplink control signal overlaps with a time domain resource used for transmitting the uplink data.

If the time domain resource used for transmitting the uplink control signal overlaps with the time domain resource used for transmitting the uplink data, the S110 further includes:

S103: the first terminal device determines that the uplink multiple access scheme for the uplink control signal is the same as the uplink multiple access scheme for the uplink data, that is, the first uplink multiple access scheme.

If the time domain resource used for transmitting the uplink control signal does not overlap with the time domain resource used for transmitting the uplink data, the S110 further includes:

S104: the first terminal device determines that the uplink multiple access scheme for the uplink control signal is the uplink multiple access scheme pre-configured by the network device, that is, the second uplink multiple access scheme.

In the situation where the first time domain resource unit used for transmitting the uplink control signal is not used for transmitting the uplink data, the S110 includes:

S105: the first terminal device determines that the uplink multiple access scheme for the uplink control signal is the uplink multiple access scheme pre-configured by the network device, that is, the second uplink multiple access scheme.

It should be understood that multiple manners may be used by the first terminal device to determine the uplink multiple access scheme for the uplink control signal, and which specific manner is adopted by the first terminal device to determine the uplink multiple access scheme is not limited in the embodiment of the present disclosure.

S120: the first terminal device transmits the uplink control signal by using the determined uplink multiple access scheme.

The first terminal device may transmit the uplink control signal by using the uplink multiple access scheme determined by S110. The uplink multiple access scheme may include multiple types, and operations of the first terminal device corresponding to different uplink multiple access schemes may be different.

For example, if the uplink multiple access scheme for the uplink control signal is DFT-S-OFDM or SC-FDMA, the S120 may include:

after performing a discrete Fourier transform DFT on the uplink control signal, the first terminal device transmits the converted uplink control signal.

For another example, if the determined uplink multiple access scheme is CP-OFDM or OFDMA, the S120 may include:

after adding a cyclic prefix CP into the uplink control signal, the first terminal device transmits the uplink control signal with CP added.

It should be noted that, if the determined uplink multiple access scheme is CP-OFDM or OFDMA, the first terminal device does not perform the DFT on the uplink control signal in advance.

In an embodiment, the method 100 may further include: the first terminal device determines an uplink control channel structure corresponding to the determined uplink multiple access scheme; and S120 may include:

the first terminal device transmits the uplink control signal by using the determined uplink multiple access scheme and the determined uplink control channel structure.

Specifically, the uplink control channel structure corresponding to the uplink multiple access scheme may be pre-appointed by the terminal device and the network device. For example, the first uplink multiple access scheme corresponds to a first uplink control channel structure, and the second uplink multiple access scheme corresponds to a second uplink control channel structure. The uplink control channel structure may include at least one of the following:

1) a resource location of a demodulation reference signal (Demodulate Reference Signal, DMRS) of an uplink control channel. For example, whether the DMRS used for demodulating the uplink control channel occupies a complete OFDM symbol or a portion of subcarriers in the symbol.

2) a transmission mode for the uplink control signal carried by the uplink control channel. For example, whether the uplink control signal is carried by a sequence or by a constellation modulation signal.

3) a time domain resource occupied by the uplink control channel. For example, the number of symbols occupied by the uplink control signal.

4) a frequency domain resource occupied by the uplink control channel. For example, whether the uplink control signal occupies an entire transmission bandwidth of the user, or only a plurality of physical resource blocks (Physical Resource Blocks, PRBs) on an edge of the transmission bandwidth of the user.

As a possible implementation manner, there may be a mapping relationship between the uplink multiple access scheme and the uplink control channel structure, and the first terminal device may determine the corresponding uplink control channel structure according to the determined uplink multiple access scheme and the mapping relationship.

It should be noted that, in the prior art, the first terminal device can only transmit the uplink control signal by using DFT-S-OFDM. In embodiments of the present disclosure, the first terminal device may determine the uplink multiple access scheme according to whether the time domain resources unit used for transmitting the uplink control signal is further used for transmitting the uplink data.

Therefore, in the method for transmitting the uplink signal according to the embodiment of the present disclosure, the first terminal device may determine an appropriate uplink multiple access scheme for the uplink control signal according to a condition of the time domain resource unit used for transmitting the uplink control signal. Therefore, a good compromise is made between the implementation complexity and flexibility of the terminal device, thereby being beneficial to the uplink control signal transmission.

It should be noted that the classification of the situations and manners in the embodiments of the present disclosure is only for the convenience of description, and should not be construed as specific limitations. The features in various situations and manners can be combined without contradiction.

Methods for transmitting an uplink signal according to embodiments of the present disclosure have been described in detail above with reference to FIGS. 1 and 2. In the following, apparatuses for transmitting an uplink signal according to embodiments of the present disclosure will be described in detail with reference to FIGS. 3 and 4.

Figure 3:
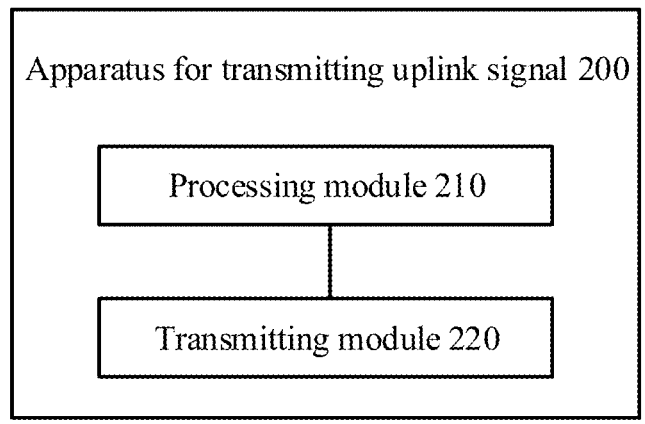
FIG. 3 is a schematic block diagram of an apparatus for transmitting an uplink signal according to an embodiment of the present disclosure.

FIG. 3 is a schematic block diagram of an apparatus for transmitting an uplink signal according to an embodiment of the present disclosure. The apparatus 200 may be a first terminal device. As shown in FIG. 3, the apparatus 200 includes:

a processing module 210, configured to determine an uplink multiple access scheme for an uplink control signal according to whether a time domain resource unit used for transmitting the uplink control signal is also used for transmitting uplink data;

a transmitting module 220, configured to transmit the uplink control signal by using the determined uplink multiple access scheme.

In an embodiment, the processing module 210 is specifically configured to: if the time domain resource unit is also used for transmitting the uplink data, determine that the uplink multiple access scheme for the uplink control signal is the same as an uplink multiple access scheme for the uplink data.

In an embodiment, the processing module 210 is specifically configured to: if the time domain resource unit is not used for transmitting the uplink data, determine that the uplink multiple access scheme for the uplink control signal is an uplink multiple access scheme pre-configured by a network device for transmitting the uplink control signal.

In an embodiment, the processing module 210 is specifically configured to: if the time domain resource unit is also used for transmitting the uplink data, determine the uplink multiple access scheme for the uplink control signal according to whether a time domain resource occupied by the uplink control signal overlaps with a time domain resource occupied by the uplink data.

In an embodiment, the processing module 210 is specifically configured to: if the time domain resource unit is also used for transmitting the uplink data, and a time domain resource occupied by the uplink control signal at least partially overlaps with a time domain resource occupied by the uplink data, determine that the uplink multiple access scheme for the uplink control signal is the same as an uplink multiple access scheme for the uplink data.

In an embodiment, the processing module 210 is specifically configured to: if the time domain resource unit is also used for transmitting the uplink data, and a time domain resource occupied by the uplink control signal does not overlap with a time domain resource occupied by the uplink data, determine that the uplink multiple access scheme for the uplink control signal is an uplink multiple access scheme pre-configured by a network device for transmitting the uplink control signal.

In an embodiment, the processing module 210 is specifically configured to: determine the uplink multiple access scheme for the uplink control signal according to whether the first terminal device transmits the uplink data over the time domain resource unit; or determine the uplink multiple access scheme for the uplink control signal according to whether there is a terminal device that transmits uplink data over the time domain resource unit.

In an embodiment, the uplink multiple access scheme includes discrete Fourier transform-spread-orthogonal frequency division multiplexing DFT-S-OFDM, cyclic prefix-orthogonal frequency division multiplexing CP-OFDM, single carrier-frequency division multiple access SC-FDMA or orthogonal frequency division multiple access OFDMA.

In an embodiment, if the determined uplink multiple access scheme is DFT-S-OFDM or SC-FDMA, the transmitting module 220 is specifically configured to: transmit the uplink control signal after performing a discrete Fourier transform DFT on the uplink control signal.

In an embodiment, if the determined uplink multiple access scheme is CP-OFDM or OFDMA, the transmitting module 220 is specifically configured to: transmit the uplink control signal after adding a cyclic prefix CP into the uplink control signal.

In an embodiment, the processing module 210 is further configured to: determine an uplink control channel structure corresponding to the determined uplink multiple access scheme; the transmitting module 220 is specifically configured to: transmit the uplink control signal by using the determined uplink multiple access scheme and the determined uplink control channel structure.

In an embodiment, the control channel structure includes at least one of the following: a resource location of a demodulation reference signal DMRS of an uplink control channel; a transmission mode for the uplink control signal carried by the uplink control channel; a time domain resource occupied by the uplink control channel; and a frequency domain resource occupied by the uplink control channel.

In an embodiment, the time domain resource unit includes a subframe, a slot, a mini-slot or an orthogonal frequency division multiplexing OFDM symbol.

It should be noted that the apparatus 200 may correspond to the first terminal device in the method for transmitting the uplink signal 100 according to the embodiment of the present disclosure. The apparatus 200 may include modules for performing the method performed by the first terminal device in the method of FIG. 1 and/or FIG. 2. In addition, the modules in the apparatus 200 and other operations and/or functions described above are respectively used to implement the corresponding processes of the method of FIG. 1 and/or FIG. 2, and are not described herein again for the sake of brevity.

Figure 4:
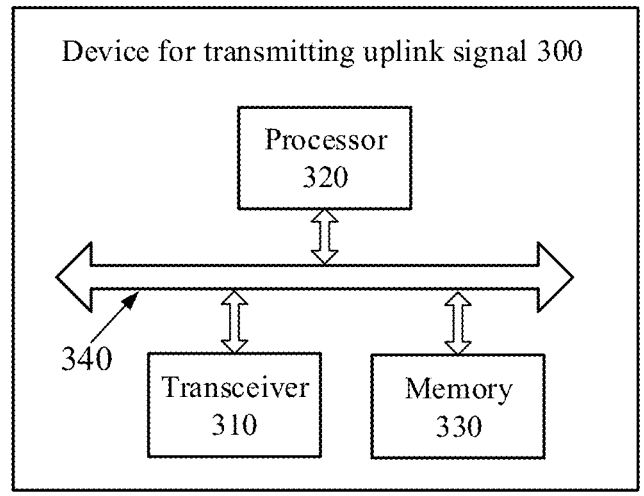
FIG. 4 is a schematic block diagram of a device for transmitting an uplink signal according to an embodiment of the present disclosure.

FIG. 4 is a schematic block diagram of a device for transmitting an uplink signal according to an embodiment of the present disclosure. The device 300 may be a first terminal device. As shown in FIG. 4, the device 300 includes:

a transceiver 310, a processor 320, a memory 330, and a bus system 340, where the transceiver 310, the processor 320 and the memory 330 are connected via the bus system 340, the memory 330 is configured to store instructions, the processor 320 is configured to execute the instructions stored in the memory 330 to control the transceiver 310 to transmit and receive a signal. The memory 330 may be arranged in the processor 320, or may be separated from the processor.

The processor 320 is configured to determine an uplink multiple access scheme for an uplink control signal according to whether a time domain resource unit used for transmitting the uplink control signal is also used for transmitting uplink data;

The transceiver 310 is configured to transmit the uplink control signal by using the determined uplink multiple access scheme.

In an embodiment, the processor 320 is specifically configured to: if the time domain resource unit is also used for transmitting the uplink data, determine that the uplink multiple access scheme for the uplink control signal is the same as an uplink multiple access scheme for the uplink data.

In an embodiment, the processor 320 is specifically configured to: if the time domain resource unit is not used for transmitting the uplink data, determine that the uplink multiple access scheme for the uplink control signal is an uplink multiple access scheme pre-configured by a network device for transmitting the uplink control signal.

In an embodiment, the processor 320 is specifically configured to: if the time domain resource unit is also used for transmitting the uplink data, determine the uplink multiple access scheme for the uplink control signal according to whether a time domain resource occupied by the uplink control signal overlaps with a time domain resource occupied by the uplink data.

In an embodiment, the processor 320 is specifically configured to: if the time domain resource unit is also used for transmitting the uplink data, and a time domain resource occupied by the uplink control signal at least partially overlaps with a time domain resource occupied by the uplink data, determine that the uplink multiple access scheme for the uplink control signal is the same as an uplink multiple access scheme for the uplink data.

In an embodiment, the processor 320 is specifically configured to: if the time domain resource unit is also used for transmitting the uplink data, and a time domain resource occupied by the uplink control signal does not overlap with a time domain resource occupied by the uplink data, determine that the uplink multiple access scheme for the uplink control signal is an uplink multiple access scheme pre-configured by the network device for transmitting the uplink control signal.

In an embodiment, the processor 320 is specifically configured to: determine the uplink multiple access scheme for the uplink control signal according to whether the first terminal device transmits the uplink data over the time domain resource unit; or determine the uplink multiple access scheme for the uplink control signal according to whether there is a terminal device that transmits the uplink data over the time domain resource unit.

In an embodiment, the uplink multiple access scheme includes discrete Fourier transform-spread-orthogonal frequency division multiplexing DFT-S-OFDM, cyclic prefix-orthogonal frequency division multiplexing CP-OFDM, single carrier-frequency division multiple access SC-FDMA or orthogonal frequency division multiple access OFDMA.

In an embodiment, if the determined uplink multiple access scheme is DFT-S-OFDM or SC-FDMA, the transceiver 310 is specifically configured to: transmit the uplink control signal after performing a discrete Fourier transform DFT on the uplink control signal.

In an embodiment, if the determined uplink multiple access scheme is CP-OFDM or OFDMA, the transceiver 310 is specifically configured to: transmit the uplink control signal after adding a cyclic prefix CP into the uplink control signal.

In an embodiment, the processor 320 is further configured to: determine an uplink control channel structure corresponding to the determined uplink multiple access scheme; the transceiver 310 is specifically configured to: transmit the uplink control signal by using the determined uplink multiple access scheme and the determined uplink control channel structure.

In an embodiment, the control channel structure includes at least one of the following: a resource location of a demodulation reference signal DMRS of an uplink control channel; a transmission mode for the uplink control signal carried by the uplink control channel; a time domain resource occupied by the uplink control channel; and a frequency domain resource occupied by the uplink control channel.

In an embodiment, the time domain resource unit includes a subframe, a slot, a mini-slot, or an orthogonal frequency division multiplexing OFDM symbol.

It should be noted that the device 300 may correspond to the first terminal device in the method for transmitting the uplink signal 100 according to the embodiment of the present disclosure. The device 300 may include entity units for performing the method performed by the first terminal device in the method of FIG. 1 and/or FIG. 2. In addition, the entity units in the device 300 and other operations and/or functions described above are respectively used to implement the corresponding processes of the method of FIG. 1 and/or FIG. 2, and are not described herein again for the sake of brevity.

It should be understood that the processor in the embodiment of the present disclosure may be an integrated circuit chip with capability of signal processing. In the process of implementation, each step of the foregoing method embodiments may be completed by an integrated logic circuit of hardware in the processor or instructions in a form of software. The processor may be a central processing unit (Central Processing Unit, CPU), the processor may also be other general purpose processor, a digital signal processor (Digital Signal Processor, DSP), or an application specific integrated circuit (Application Specific Integrated Circuit, ASIC), a field programmable gate array (Field Programmable Gate Array, FPGA) or other programmable logic device, discrete gate or transistor logic device, discrete hardware component. The methods, steps, and logical block diagrams disclosed in the embodiments of the present disclosure may be implemented or performed. The general purpose processor may be a microprocessor or any conventional processor, or the like. The steps in connection with the methods disclosed in the embodiments of the present disclosure may be directly implemented by a hardware decoding processor, or may be performed by a combination of hardware and software in the decoding processor. The software may be located in a mature storage medium in the art, such as a random memory, a flash memory, a read-only memory, a programmable read-only memory or an electrically erasable programmable memory, a register, or the like. The storage medium is located in the memory, and the processor reads information in the memory and combines the hardware to complete the steps of the above methods.

It should also be understood that the memory in embodiments of the present disclosure may be a volatile memory or non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (Random Access Memory, RAM) that acts as an external cache. By way of example and not limitation, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchlink dynamic random access memory (Synchlink DRAM, SLDRAM) and direct rambus random access memory (Direct Rambus RAM, DR RAM). Note that the memory in the system and method described in the present disclosure is intended to include, without being limited to, these and any other suitable types of memory.

It should also be understood that in addition to data bus, the bus system may also include a power bus, a control bus, a status signal bus, or the like. However, for the sake of clarity, various buses are labeled as the bus system in the figures.

It should also be understood that in the embodiments of the present disclosure, "B corresponding to A" indicates that B is associated with A, and B can be determined according to A. However, it should also be understood that the determining of B according to A does not indicate that B is determined solely according to A merely, but B can also be determined according to A and/or other information. It should be understood that the term "and/or" herein is merely an association relationship describing associated objects, and indicates that there may be three relationships. For example, A and/or B may indicate that: A is solely presented, A and B are both presented, B is solely presented. In addition, the character "/" herein generally indicates an "or" relationship between contextual objects.

In the process of implementation, each step in the above methods may be completed by an integrated logic circuit of hardware in a processor or instructions in a form of software. The steps in connection with the method for transmitting an uplink signal disclosed in the embodiments of the present disclosure may be directly implemented by a hardware processor, or may be performed by a combination of hardware and software in the processor. The software may be located in a mature storage medium in the art, such as a random memory, a flash memory, a read-only memory, a programmable read-only memory or an electrically erasable programmable memory, a register, or the like. The storage medium is located in the memory, and the processor reads information in the memory and combines the hardware to complete the steps of the above methods. To avoid repetition, details will not be described herein.

Embodiments of the present disclosure also provide a computer readable storage medium storing one or more programs, where the one or more programs includes instructions, when the instructions are executed by a portable electronic device having a plurality of applications, the portable electronic device are enabled to perform the method according to the embodiment shown in FIG. 1 and/or FIG. 2.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods to implement the described functions for each particular application, but such implementation should not be considered to go beyond the scope of the embodiments of the present disclosure.

Those of ordinary skill in the art can clearly understand that for the convenience and brevity of the description, for specific working processes of the systems, the apparatuses and the units described above, reference may be made to the corresponding processes in the foregoing method embodiment, and details are not described herein again.

In the several embodiments provided in the present application, it should be understood that the disclosed systems, apparatuses, and methods may be implemented in other manners. For example, the apparatus embodiments described above are merely illustrative, for example, the division of units is only division of logical functions, there may be another division manner in actual implementation, for example, multiple units or components may be combined or integrated into another system, or some features can be omitted or not executed. In addition, a coupling or direct coupling or communication connection shown or discussed may be an indirect coupling or communication connection via some interfaces, apparatuses or units, and may be electrical, mechanical or in other forms.

The units described as separate components may or may not be physically separated, and the components shown as units may or may not be physical units, that is, may be located in one place, or may be distributed across multiple network units. Some or all of the units may be selected according to actual needs to achieve the purpose of the solution of the embodiments.

In addition, each function unit in each of the embodiments of the present disclosure may be integrated into one processing unit, or each unit may present physically separately, or two or more units may be integrated into one unit.

The functions may be stored in a computer readable storage medium if implemented in the form of a software functional unit and sold or used as a standalone product. Based on such understanding, the technical solution of the embodiments of the present disclosure, or a part of the technical solution of the embodiments of the present disclosure contributing to the prior art or a part of the technical solution may be embodied in the form of a software product stored in a storage medium, where a number of instructions are included to enable a computer device (which may be a personal computer, a server, or a network device, or the like) to perform all or part of the steps of the methods described in the embodiments of the present disclosure. The foregoing storage medium includes various medium capable of storing program codes, such as a USB flash disk, a mobile hard disk, a read-only memory (ROM), a random access memory (RAM), a magnetic disk, or a compact disk, and the like.

The above description is only specific implementations of the embodiments of the present disclosure, but the scope of protection of the embodiments of the present disclosure is not limited thereto. Any modifications or substitutions readily conceived by those skilled in the art within the scope of the present disclosure should be covered in the protection scope of the embodiments of the present disclosure. Therefore, the protection scope of the embodiments of the present disclosure is subject to the protection scope of the appended claims.

What is claimed is:

1. A method for transmitting an uplink signal, comprising:
under a condition that a time domain resource unit used for transmitting an uplink control signal on a physical uplink control channel (PUCCH) satisfies a following condition 1:
condition 1: the time domain resource unit is further used for transmitting uplink data on a physical uplink shared channel (PUSCH), and
under a condition that the time domain resource unit further satisfies a following condition 2 on the basis of satisfying the condition 1:
condition 2: a time domain resource occupied by the uplink control signal on the PUCCH at least partially overlaps with a time domain resource occupied by the uplink data on the PUSCH in terms of slots,
determining, by a first terminal device, an uplink multiple access scheme for the uplink control signal is an uplink multiple access scheme for the uplink data, wherein there is a mapping relationship between the uplink multiple access scheme and an uplink control channel structure, and the uplink multiple access scheme comprises discrete Fourier transform-spread-orthogonal frequency division multiplexing (DFT-S-OFDM) or cyclic prefix-orthogonal frequency division multiplexing (CP-OFDM);
determining, by the first terminal device, an uplink control channel structure corresponding to the determined uplink multiple access scheme according to the determined uplink multiple access scheme and the mapping relationship, the uplink control channel structure comprises a slot occupied by an uplink control channel and a time domain resource occupied by the uplink control channel; and
transmitting, by the first terminal device, the uplink control signal by using the determined uplink multiple access scheme and the slot occupied by the uplink control channel.

2. The method according to claim 1, wherein before the determining, by the first terminal device, the uplink control channel structure corresponding to the determined uplink multiple access scheme according to the determined uplink multiple access scheme and the mapping relationship, further comprising:
determining, by the first terminal device, that the uplink multiple access scheme for the uplink control signal is an uplink multiple access scheme pre-configured by a network device for transmitting the uplink control signal under a condition that the time domain resource unit is not used for transmitting the uplink data on the PUSCH.

3. The method according to claim 1, wherein before the determining, by the first terminal device, the uplink control channel structure corresponding to the determined uplink multiple access scheme according to the determined uplink multiple access scheme and the mapping relationship, further comprising:
determining, by the first terminal device, that the uplink multiple access scheme for the uplink control signal is an uplink multiple access scheme pre-configured by a network device for transmitting the uplink control signal under a condition that the time domain resource unit is used for transmitting the uplink data on the PUSCH, and the time domain resource occupied by the uplink control signal on the PUCCH does not overlap with the time domain resource occupied by the uplink data on the PUSCH.

4. The method according to claim 1, wherein the uplink data comprises: uplink data of the first terminal device or uplink data of a second terminal device, wherein the first terminal device and the second terminal device are different terminal devices.

5. The method according to claim 1, wherein the uplink multiple access scheme further comprises single carrier-frequency division multiple access (SC-FDMA) or orthogonal frequency division multiple access (OFDMA).

6. The method according to claim 5, wherein if the determined uplink multiple access scheme is DFT-S-OFDM or SC-FDMA,
transmitting, by the first terminal device, the uplink control signal by using the determined uplink multiple access scheme and the determined uplink control channel structure, comprises:
transmitting, by the first terminal device, the uplink control signal after performing a discrete Fourier transform (DFT) on the uplink control signal.

7. The method according to claim 5, wherein if the determined uplink multiple access scheme is CP-OFDM or OFDMA,
transmitting, by the first terminal device, the uplink control signal by using the determined uplink multiple access scheme and the determined uplink control channel structure, comprises:
transmitting, by the first terminal device, the uplink control signal after adding a cyclic prefix (CP) into the uplink control signal.

8. The method according to claim 1, wherein the uplink control channel structure further comprises at least one of the following:
a resource location of a demodulation reference signal (DMRS) of an uplink control channel;
a transmission mode for the uplink control signal carried by the uplink control channel;
and
a frequency domain resource occupied by the uplink control channel.

9. An apparatus for transmitting an uplink signal, wherein the apparatus is a first terminal device, and the apparatus comprises:
a transceiver, a memory, a processor, and a computer program stored on the memory and operable on the processor,
wherein the processor, when running the computer program, is configured to:
under a condition that a time domain resource unit used for transmitting an uplink control signal on a physical uplink control channel (PUCCH) satisfies a following condition 1:

condition 1: the time domain resource unit is further used for transmitting uplink data on a physical uplink shared channel (PUSCH), and under a condition that the time domain resource unit further satisfies a following condition 2 on the basis of satisfying the condition 1:

condition 2: a time domain resource occupied by the uplink control signal on the PUCCH at least partially overlaps with a time domain resource occupied by the uplink data on the PUSCH in terms of slots, determine an uplink multiple access scheme for the uplink control signal is an uplink multiple access scheme for the uplink data, wherein there is a mapping relationship between the uplink multiple access scheme and an uplink control channel structure, and the uplink multiple access scheme comprises discrete Fourier transform-spread-orthogonal frequency division multiplexing (DFT-S-OFDM) or cyclic prefix-orthogonal frequency division multiplexing (CP-OFDM);

determine an uplink control channel structure corresponding to the determined uplink multiple access scheme according to the determined uplink multiple access scheme and the mapping relationship, the uplink control channel structure comprises a slot occupied by an uplink control channel and a time domain resource occupied by the uplink control channel; and control the transceiver to transmit the uplink control signal by using the determined uplink multiple access scheme and the slot occupied by the uplink control channel.

10. The apparatus according to claim 9, wherein the processor is specifically configured to: determine that the uplink multiple access scheme for the uplink control signal is an uplink multiple access scheme pre-configured by a network device for transmitting the uplink control signal under a condition that the time domain resource unit is not used for transmitting the uplink data on the PUSCH.

11. The apparatus according to claim 9, wherein the processor is specifically configured to: determine that the uplink multiple access scheme for the uplink control signal is an uplink multiple access scheme pre-configured by a network device for transmitting the uplink control signal under a condition that the time domain resource unit is used for transmitting the uplink data on the PUSCH, and the time domain resource occupied by the uplink control signal on the PUCCH does not overlap with the time domain resource occupied by the uplink data on the PUSCH.

12. The apparatus according to claim 9, wherein the uplink data comprises: uplink data of the first terminal device or uplink data of a second terminal device, wherein the first terminal device and the second terminal device are different terminal devices.

13. The apparatus according to claim 9, wherein the uplink multiple access scheme further comprises single carrier-frequency division multiple access (SC-FDMA) or orthogonal frequency division multiple access (OFDMA).

14. The apparatus according to claim 13, wherein if the determined uplink multiple access scheme is DFT-S-OFDM or SC-FDMA, the processor is specifically configured to: transmit the uplink control signal after performing a discrete Fourier transform (DFT) on the uplink control signal.

15. The apparatus according to claim 13, wherein if the determined uplink multiple access scheme is CP-OFDM or OFDMA, the processor is specifically configured to: transmit the uplink control signal after adding a cyclic prefix (CP) into the uplink control signal.

16. The apparatus according to claim 9, wherein the uplink control channel structure further comprises at least one of the following:

a resource location of a demodulation reference signal (DMRS) of an uplink control channel;

a transmission mode for the uplink control signal carried by the uplink control channel;

and a frequency domain resource occupied by the uplink control channel.

* * * * *